(12) United States Patent
Tepass et al.

(10) Patent No.: US 10,794,927 B2
(45) Date of Patent: Oct. 6, 2020

(54) METHOD AND DEVICE FOR OPERATING A ROTATIONAL SPEED SENSOR, ROTATIONAL SPEED SENSOR DEVICE

(71) Applicant: Robert Bosch GmbH, Stuttgart (DE)

(72) Inventors: Bernd Tepass, Beilstein (DE);
Wolfgang Welsch, Heidelberg (DE);
Oliver Hahn, Obergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 15/745,501

(22) PCT Filed: May 24, 2016

(86) PCT No.: PCT/EP2016/061697
§ 371 (c)(1),
(2) Date: Jan. 17, 2018

(87) PCT Pub. No.: WO2017/012744
PCT Pub. Date: Jan. 26, 2017

(65) Prior Publication Data
US 2018/0210004 A1    Jul. 26, 2018

(30) Foreign Application Priority Data

Jul. 20, 2015 (DE) ......................... 10 2015 213 572

(51) Int. Cl.
*G01B 7/14* (2006.01)
*G01P 3/489* (2006.01)
(Continued)

(52) U.S. Cl.
CPC .............. *G01P 3/489* (2013.01); *G01D 5/145* (2013.01); *G01D 5/2451* (2013.01)

(58) Field of Classification Search
CPC ........ G01D 5/145; G01D 5/147; G01D 5/202; G01D 5/206; G01D 5/225; G01D 5/2208;
(Continued)

(56) References Cited

U.S. PATENT DOCUMENTS 5,774,068 A * 6/1998 Seki ..................... G01D 5/2455
250/231.14
6,014,599 A * 1/2000 Inoue .................... B60C 23/061
324/178

(Continued)

FOREIGN PATENT DOCUMENTS

DE        196 34 715 A1    3/1998
DE   10 2014 107 313 A1   12/2014
(Continued)

OTHER PUBLICATIONS

International Search Report corresponding to PCT Application No. PCT/EP2016/061697, dated Aug. 17, 2016 (German and English language document) (8 pages).

*Primary Examiner* — Thang X Le
(74) *Attorney, Agent, or Firm* — Maginot, Moore & Beck LLP

(57) ABSTRACT

The disclosure relates to a method for operating a rotational speed sensor of a motor vehicle with a signal encoder ring having a plurality of magnet elements arranged uniformly over its circumference with alternating orientation, and with a signal receiver having at least two sensor elements arranged uniformly apart from one another for sensing magnetic fields of the magnets. Information bits are generated based on magnetic field strengths detected by the sensor elements and made available as a rotational speed information signal. At a low rotational speed, an additional rotational speed information signal is generated and added to the rotational speed information signal. The additional signal comprises additional rotational speed pulses inserted
(Continued)

between two normal rotational speed pulses. As a result, a plurality of rotational speed pulses are available per period of the encoder ring and a higher resolution of determination of the speed becomes possible.

15 Claims, 2 Drawing Sheets

(51) Int. Cl.
*G01D 5/245* (2006.01)
*G01D 5/14* (2006.01)

(58) Field of Classification Search
CPC .. G01D 5/12; G01D 5/14; G01D 5/16; G01D 5/2457; G01D 5/2013; G01D 5/2046; G01D 7/04; G01R 33/0206; G01R 33/06; G01R 33/063; G01R 33/09; G01R 33/093; G01R 33/0052; G01R 33/18; G01P 1/026; G01P 3/66; G01P 3/68; G01P 3/665; G01P 3/443; G01P 3/448; G01P 3/487; G01P 3/481; G01P 3/685; G01N 27/9033; G01N 27/902; G01N 27/9013; G01N 27/904; G01N 27/223; G01N 27/82; G01N 27/9093

See application file for complete search history.

(56) References Cited

U.S. PATENT DOCUMENTS

| | | | |
|---|---|---|---|
| 2003/0110860 A1* | 6/2003 | Okada | B60B 27/00 73/593 |
| 2005/0179429 A1 | 8/2005 | Lohberg | |
| 2005/0211002 A1* | 9/2005 | Hara | G01P 3/487 73/862.326 |
| 2008/0036454 A1* | 2/2008 | Landrieve | G01D 5/24419 324/207.25 |
| 2008/0180090 A1 | 7/2008 | Stolfus et al. | |
| 2012/0116664 A1 | 5/2012 | Shibata | |
| 2012/0313623 A1* | 12/2012 | Hammerschmidt | H03M 1/28 324/207.2 |
| 2015/0309128 A1* | 10/2015 | Raberg | G01R 33/0041 324/252 |
| 2016/0011279 A1* | 1/2016 | Rasbornig | G01R 33/0029 324/247 |
| 2016/0218711 A1* | 7/2016 | Grambichler | H03K 5/1536 |
| 2016/0231141 A1* | 8/2016 | Endres | B60T 8/885 |

FOREIGN PATENT DOCUMENTS

| | | |
|---|---|---|
| EP | 1 393 082 A1 | 3/2004 |
| JP | 2005-523436 A | 8/2005 |
| WO | 2011/010593 A1 | 1/2011 |
| WO | 2016/023769 A2 | 2/2016 |

* cited by examiner

METHOD AND DEVICE FOR OPERATING A ROTATIONAL SPEED SENSOR, ROTATIONAL SPEED SENSOR DEVICE

This application is a 35 U.S.C. § 371 National Stage Application of PCT/EP2016/061697, filed on May 24, 2016, which claims the benefit of priority to Serial No. DE 10 2015 213 572.1, filed on Jul. 20, 2015 in Germany, the disclosures of which are incorporated herein by reference in their entirety.

The present disclosure relates to a method for operating a rotational speed sensor, in particular as an integral part of a motor vehicle, said rotational speed sensor including a signal generator ring having multiple magnetic elements which are distributed over its circumference having an alternating orientation, and a signal receiver having at least two sensor elements for detecting the magnetic fields of the magnetic elements, wherein the sensor elements are spaced at an equal distance from one another, and wherein information bits are generated as a function of the magnetic field strengths detected by the sensor elements and are provided as a rotational speed information signal.

Furthermore, the present disclosure relates to a corresponding apparatus for operating a rotational speed sensor, and a rotational speed sensor device including the described rotational speed sensor and including the aforementioned apparatus.

BACKGROUND

In automotive engineering, knowledge about instantaneous rotational speeds is important for safety-related systems and for correctly controlling various drive systems. Calibration with the actual rotational speed is highly important in particular for controlling electric machines. Generally, the rotational speed is detected by means of a rotational speed sensor. The piece of information about the wheel rotational speed is in particular detected by sampling a magnetic encoder or a ferromagnetic toothed wheel which is configured as a signal generator ring having multiple magnetic elements which are equally distributed over its circumference, in particular permanent magnets which have an alternating magnetic orientation. By means of one or multiple sensor elements which are fixedly arranged in the housing, the magnetic fields of the magnetic elements are detected during rotation of the signal generator ring, wherein an output current is provided for further use as a rotational speed information signal by means of a current interface of a control unit, as a function of the strength of the respective detected magnetic field.

The piece of rotational speed information is provided with every change in direction of the magnetic field. The resolution of the rotational speed signal is thus essentially a function of the number of magnetic elements of the signal generator ring.

SUMMARY

By means of the method having the features according to the disclosure, the advantage is achieved that the signal resolution, or rather the resolution of the piece of rotational speed information, which is basically a function of the number and arrangement of the magnetic elements, is increased independently of or relative to the number and arrangement of the magnetic elements of the signal generator ring. According to the present disclosure, it is provided that an additional piece of information is added to the rotational speed information signal and provided, wherein the additional piece of information results in an increased displacement resolution. According to the present disclosure, it is provided that at least one additional rotational speed information signal is generated and added to the rotational speed information signal, as a function of an ascertained rotational speed, in particular of the signal generator ring. As a result of the additional rotational speed information signal being added as a function of the detected rotational speed, it is achieved that the additional rotational speed information signal is omitted in ranges in which the additional rotational speed information signal is no longer needed due to an overlap with the conventional rotational speed information signal, and is provided where it is needed, in particular in low rotational speed ranges. Preferably, the additional rotational speed information signal is provided as an additional information bit, in particular in the rotational speed information signal.

In particular, it is provided that the additional rotational speed information signal is generated only until the ascertained rotational speed exceeds a predefinable limit rotational speed or threshold speed. Thus, the rotational speed resolution is provided only in a rotational speed range which is below the limit rotational speed. In particular if the signal generator ring is associated with an electric drive machine of the motor vehicle, the rotational speed of the drive machine and a traveling distance of the motor vehicle may thereby be particularly accurately determined at low traveling speeds of the motor vehicle. The method is in particular carried out if a parking operation, in particular an automated parking operation, is carried out. In the low speed range of, for example, 0 to 50 km/h, a multiplied interface frequency is obtained via the method, while in the higher speed range, for example above 50 km/h, i.e., in particular above the limit rotational speed, a fundamental interface frequency is present which provides a reliable result even in the case of a further increasing rate of rotation/speed. The suppression of the additional piece of information may take place via the omission of the entire "speed pulse including bit protocol" information packet or via a successive omission of the data bits/information bits and finally the speed pulse.

Particularly preferably, it is provided that the additional rotational speed information signal is generated as a function of a detected magnetic field strength. Thus, by specifying limit values, it may be achieved that the additional information bit or additional rotational speed information signal is additionally output at one or multiple different magnetic field strengths, in order to increase the rotational speed information.

Particularly preferably, it is provided that the additional rotational speed information signal is generated having a current strength which is different from the current strength of the information bits, so that it is easily possible to differentiate between an information bit and an additional information bit during the evaluation of the rotational speed information signal.

Particularly preferably, an AK protocol is used for generating the rotational speed information signal. A typical interface current generated by the rotational speed sensor of, for example, $I_L=7$ mA, then produces a "low" as signal information in the rotational speed information signal; a typical interface current of $I_M=14$ mA produces a medium current for bit information; and an interface current of $I_H=28$ mA produces a synchronization pulse as signal information. The interface current of the additional information bit is advantageously between the aforementioned current values.

Preferably, it is provided that the additional information bit results in an interface current of $I_Z$=21 mA.

Furthermore, it is preferably provided that the rotational speed sensor or the signal receiver has three sensor elements, wherein output signals of the sensor elements are linked to one another for increasing the resolution of the rotational speed information signal. Thus, the resolution of the rotational speed signal may be increased to different levels as a function of the selected linking. In addition to the signal profiles of the individual bridges, additional information is provided via the selected link or links, for example, a specification of the direction of rotation, which improves or facilitates the evaluation of the rotational speed information signal.

According to one preferred refinement of the present disclosure, it is provided that during the detection of a magnetic field strength maximum (negative and/or positive), an additional information bit is generated. As a result, in addition to the normally detected zero crossings the AK protocol, information about the maxima of the detected magnetic amplification is also provided, so that the resolution of the piece of rotational speed information is at least doubled, which results in the aforementioned advantages, in particular at the low speeds, as previously mentioned.

The apparatus according to the present disclosure having the features of one embodiment is characterized in that the control unit is specifically arranged to carry out the method according to the present disclosure. The aforementioned advantages thus result. Additional features and advantages result from the previous description and from the embodiments described herein.

The rotational speed sensor device according to the present disclosure having the features of one embodiment is characterized by the apparatus according to the present disclosure. The aforementioned advantages thus result for the rotational speed sensor device. Additional features and advantages result from the previous description and from the embodiments described herein.

Particularly preferably, it is provided that the signal receiver has three sensor elements which are in particular configured as a bridge circuit. The resolution of the rotational speed information signal is further increased in particular via a link of the signal outputs of the bridge circuit.

BRIEF DESCRIPTION OF THE DRAWINGS

The disclosure is to be described in greater detail below based on the drawing, in which.

DETAILED DESCRIPTION

Generally, the rotational speed of a wheel or a drive machine is contactlessly ascertained with the aid of a rotational speed sensor. In this case, it is known to associate an encoder in the form of a signal generator ring with the rotating element, said signal generator ring having a plurality of magnetic elements which are equally distributed over its circumference and which are arranged having an alternating magnetic orientation. At least two fixed sensor elements are associated with the signal generator ring on the housing side, said sensor elements being able to detect the magnetic fields generated by the magnetic elements. If the signal generator ring rotates, the magnetic field strengths detected by the sensor elements change, whereby, for example, the signal profiles $S_R$ and $S_L$ shown in FIG. 1 result.

Figure 1:
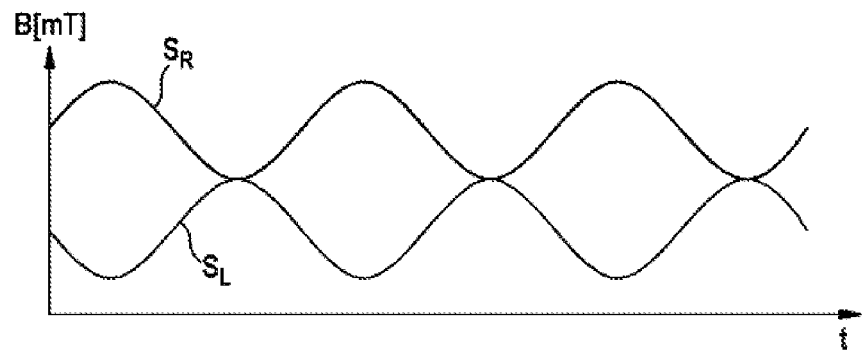
FIG. 1 shows a method for generating an additional rotational speed information signal.

FIG. 1 shows an exemplary embodiment of a rotational speed sensor device which comprises two sensor elements $S_R$, $S_L$: a right sensor element (R) and a left sensor element (L). Due to the spacing of the sensor elements from one other and the spacing of the adjacent magnetic elements from one another, the depicted magnetic field strengths result. By using the known AK protocol, a rotational speed information signal is provided by means of a current interface, as a function of the detected magnetic field strengths. A typical interface current which is provided by the rotational speed sensor device of $I_L$=7 mA produces a "low" as signal information in the control unit; a typical interface current of $I_N$=14 mA produces a medium current for bit information; and an interface current of $I_H$=28 mA produces a synchronization pulse as signal information.

Figure 3:
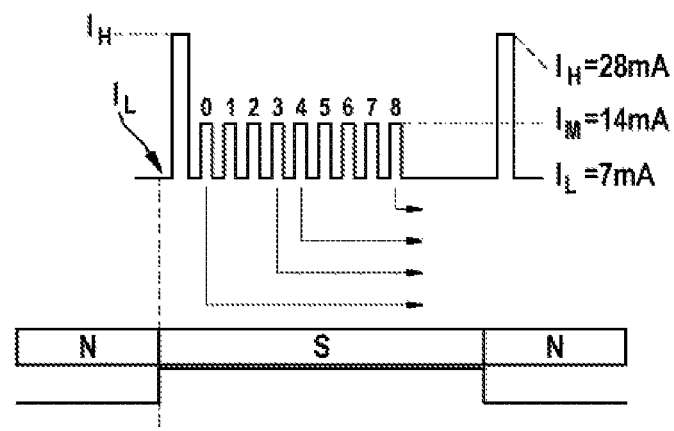
FIG. 3 shows a known method.

This is depicted in FIG. 3 by way of example. The piece of rotational speed information occurs with every change from a north pole to an adjacent south pole S of the signal generator ring, and from the south pole S to the north pole N, i.e., with every change of the orientation of the magnetic field. Thus, the resolution of a piece of rotational speed information and displacement information is limited by the number of magnetic elements of the signal generator ring. By means of the method described below, the resolution of the rotational speed information signal is increased, so that a more accurate piece of information about a distance traveled is provided even at slow rotational speeds, so that the method may be used, for example, in an automated parking procedure of a motor vehicle or in so-called remote-controlled parking. In this case, one of the information bits 0 to 8 may be used as an additional information bit.

In order to increase the resolution of the rotational speed information signal, according to the present exemplary embodiment, three sensor elements are provided, wherein with respect to the previously described two sensor elements $S_R$ and $S_L$, an additional sensor element $S_M$ is present which lies between the two sensor elements $S_R$ and $S_L$ and which is spaced at an equal distance from the two sensor elements. Thus, the sensor elements are in particular spatially separated from one another and are spaced at an equal distance from one another. Advantageously, additional sensor elements may also be added. In this case, the sensor elements may be designed as Hall sensors, GMR sensors, AMR sensors, or TMR sensors. In particular, it is provided that the two outer sensor elements are arranged having a defined spacing from the middle sensor element $S_M$. If additional sensor elements are added, they are also to be arranged equidistantly from the existing sensor elements.

Figure 2:
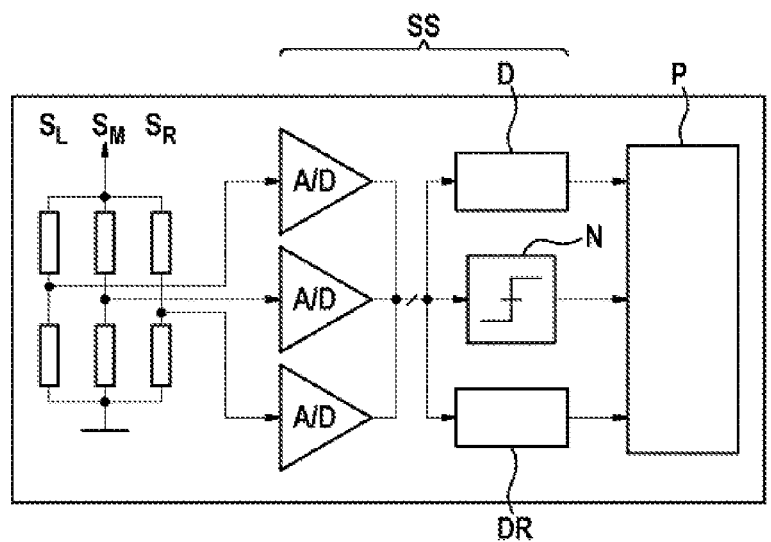
FIG. 2 shows a simplified depiction of a rotational speed sensor device.

According to the present exemplary embodiment, the three sensor elements are configured in the form of half bridges, as shown in FIG. 2. The output signals of the individual bridges are supplied to analog-digital converters A/D of a current interface SS. The current interface SS comprises a diagnosis module D, a zero-crossing detection device N, and a direction of rotation detection DR. A rotational speed function signal in the form of a protocol P is provided as the result. The evaluation of the sensor elements $S_L$, $S_M$ and $S_R$ individually or in combination is applied to the current interface SS in such a way that not only the zero crossing is mapped in the rotational speed information signal, but also the result of the sensor elements individually or in combination. As a result, a doubling, tripling, or quadrupling of the original signal frequency, and thus of the signal resolution or the information content of the rotational speed information signal, is obtained. The use of the increased signal resolution is indicated in particular via an AK protocol bit. In this case, the protocol transition, as it is generally defined in the AK protocol, is not affected at high speeds. In addition or alternatively, multiple switching thresholds are advantageously introduced either fixedly or as a function of the strength of an external stimulating signal. If any of the switching thresholds is exceeded, the rotational speed sensor device then generates a broad output pulse, via which the resolution of the rotational speed information signal is further increased. The switching thresholds may be programmably or adaptively specified.

It is also conceivable to implement the rotational speed sensor device as an angle sensor which measures the instantaneous angle of each pole pair of the magnetic elements and which outputs a change of edge or a pulse at certain positions, for example, every 30° (six edges/pulses per pole pair, instead of two previously).

Alternatively or in addition, it is conceivable to combine various sensor technologies in the rotational speed sensor device, for example, Hall sensors and xMR sensors. The advantage is that different signal technologies are sensitive to different components of the magnetic field which are provided by each of the magnetic elements, and that these components have a phase shift with respect to one other. As a result, it is possible that switching takes place in each case at the magnetic zero crossing and thus at the steepest point of the signal, thus enabling good jitter and a doubling of the displacement resolution. In addition, it is also conceivable to generate a pulse or a bit as an additional piece of information, both at the zero crossing and at the maxima or minima of the magnetic signal, i.e., of the detected magnetic field strength.

To increase the resolution of the rotational speed information signal, the following approaches are provided.

To double the resolution, it is provided that in addition to the detection and evaluation of a zero crossing, i.e., the change in the magnetic field direction, the reaching of a maximum or minimum is detected and output as an output signal.

Furthermore, for doubling the resolution, it is alternatively or additionally provided that the signal profiles of the sensor elements $S_L$, $S_M$ and $S_R$ are linked in such a way that an additional output signal is obtained as a result. Additional signal links and their evaluation make it possible to establish the direction of rotation. By means of the suitable linking of the signals of the sensor elements, a doubling of the resolution is realizable, and is to be output as an output signal. For tripling the resolution, based on the example of FIG. 2, it is provided that the respective tap of the half bridges is evaluated in such a way that the zero crossing which is detected by the respective sensor element $S_L$, $S_M$, $S_R$ is provided to the output as an output signal.

For increasing the resolution sixfold based on the arrangement of FIG. 2, it is provided that the respective tap of the half bridges is evaluated in such a way that each zero crossing which is detected only by the sensor elements $S_L$, $S_M$, $S_R$ as an output signal, and in addition, the reaching of the maximum, is detected and output as an output signal.

For additionally increasing the resolution based on the arrangement of FIG. 2, it is provided that additional equidistant sensor elements are provided. Furthermore, in addition to evaluating the zero crossing of the individual sensor elements, the maximum/minimum may also be detected and evaluated.

In particular, it is provided that a variable is ascertained via which a speed threshold may be specified. The speed threshold may advantageously be ascertained in a project-specific manner in the control unit or component. In the case of ascertaining a speed threshold which is not equal to 0, if the speed is less than or equal to the speed threshold, the above-described method for increasing the resolution of the rotational speed information signal is always implemented, and at least one additional information bit is set. Above the speed threshold, the additional information bit is no longer added to the rotational speed information signal. Particularly preferably, it is provided that a hysteresis is used for the speed threshold in order to prevent an oscillation between increased resolution and normal operation.

By means of the advantageous limitation of the method to a lower speed range which is limited by the speed threshold or by the limit rotational speed, it is ensured that in the case of lower rates of rotation or speeds, there is a high resolution of the rotational speed information signal, and in the case of high speeds, the reliable transmission of the piece of rotational speed information may still be ensured. As of a magnetic frequency of approximately 5 kHz, an AK protocol can no longer ensure the reliable transmission of information. This is due to the signal width of the protocol bits of typically 50 µs. If a "high" and a "low" are taken as a basis for a signal, a period of 100 µs results. This corresponds to an electrical frequency of 10 kHz at the AK interface and a magnetic frequency of 5 kHz.

By means of the method, in the case of low speeds/rotational speeds, an additional information bit is thus provided by the rotational speed sensor device via the current interface SS and, for example, is transmitted to a control unit, without affecting the heretofore used AK protocol. The additional information bit results in an increased displacement resolution (tick), derived from the profile of the magnetic flux density and the specific arrangement of the sensor elements $S_L$, $S_M$, $S_R$ (number and spatial position) in the rotational speed sensor.

Figure 4:
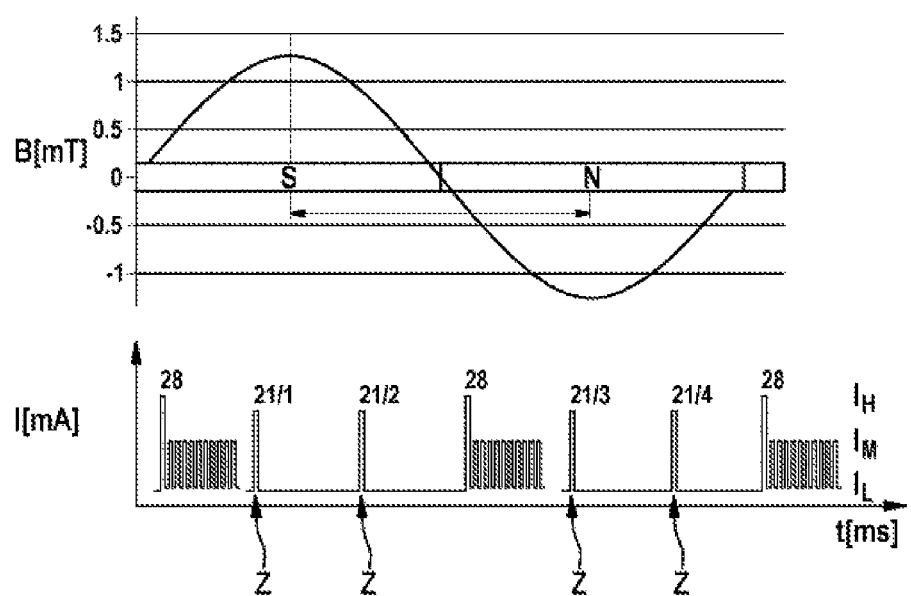
FIG. 4 shows a refinement of the method.

FIG. 4 shows, by way of example, an additional rotational speed information signal Z which is generated by the provided method and which produces an interface current $I_Z$ of 21 mA. To provide the additional rotational speed information signal, as previously mentioned, one of the information bits may be used as an additional information bit. This is obviously only by way of example; other current values may also be selected for the additional information bit.

As already mentioned, at a low rate of rotation or speed, the rotational speed information signal is supplemented via the additional piece of information, or the additional rotational speed information signal Z, or the additional information bit, which increases the displacement resolution in the present example by a factor of three. At higher speeds, in particular above 50 km/h, the additional rotational speed information signal is again removed from the signal flow.

The additional rotational speed information signal or the "additional information pulse" is incorporated into the signal information, as shown, for example, in FIG. 3, physically at every 60° signal generator ring angle. If other encoder angles/signal generator ring angles are selected, a corresponding distribution over the angle or over time results (depending on the frequency). At a typical interface frequency, the rotational speed information pulse $I_H$ (zero-crossing pulse) and the sum of the bits (14 mA) constitute a pulse packet having a fixed time pattern. The additional rotational speed information signal is associated with the encoder angle and is added to a corresponding position in the AK protocol having a corresponding amplitude (presently 21 mA), until the speed threshold is exceeded. The frequency of the signal at the current interface SS increases with increasing speed. The additional rotational speed information signal approaches the AK pulse packet as the interface frequency increases. This is due to the fixed duration for the AK pulse packet of the AK protocol. If the additional rotational speed information signal now comes within 50 μs of the AK pulse packet, the additional rotational speed information signal is first removed from the piece of interface information, wherein for this purpose, a frequency hysteresis is preferably provided in order to avoid a chaotic addition and removal of the additional rotational speed information signal. Generally, an "incorporation" of the signal having additional information bits into the bit packet is also possible for higher frequencies.

The invention claimed is:

1. A method for operating a rotational speed sensor, the rotational speed sensor including (i) a signal generator ring having a plurality of magnetic elements equally distributed over a circumference thereof with alternating magnetic orientation, and (ii) a signal receiver having at least two sensor elements configured to detect magnetic field strengths of the plurality of magnetic elements, the at least two sensor elements being spaced at an equal distance from one another, the method comprising:
    generating a rotational speed information signal having information bits as a function of the magnetic field strengths detected by the at least two sensor elements;
    generating at least one additional rotational speed information signal and adding the at least one additional rotational speed information signal to the rotational speed information signal, as a function of an ascertained rotational speed of the signal generator ring; and
    generating the additional rotational speed information signal only until the ascertained rotational speed exceeds a predefined limit rotational speed.

2. The method as claimed in claim 1, the generating of the at least one additional rotational speed information signal comprising:
    generating the at least one additional rotational speed information signal as a function of the detected magnetic field strengths.

3. The method as claimed in claim 1, the generating of the rotational speed information signal comprising:
    generating the rotational speed information signal using an AK protocol.

4. The method as claimed in claim 1, the generating of the at least one additional rotational speed information signal comprising:
    generating the at least one additional rotational speed information signal having a current strength that differs from a current strength of the rotational speed information signal.

5. The method as claimed in claim 1, wherein the at least two sensor elements of the signal receiver include three sensor elements, the method further comprising:
    linking output signals of the three sensor elements to one another to increase a resolution of the rotational speed information signal.

6. The method as claimed in claim 1, the generating of the at least one additional rotational speed information signal comprising:
    generating an additional rotational speed information signal in each case of a detection of a magnetic field strength maximum.

7. The method as claimed in claim 1, wherein the rotational speed sensor is a rotational speed sensor of a motor vehicle.

8. An apparatus for operating a rotational speed sensor, the rotational speed sensor including (i) a signal generator ring having a plurality of magnetic elements equally distributed over a circumference thereof with alternating magnetic orientation, and (ii) a signal receiver having at least two sensor elements configured to detect magnetic field strengths of the plurality of magnetic elements, the at least two sensor elements being spaced at an equal distance from one another, the apparatus comprising:
    a control unit configured to (i) generate a rotational speed information signal having information bits as a function of the magnetic field strengths detected by the at least two sensor elements, and (ii) generate at least one additional rotational speed information signal and add the at least one additional rotational speed information signal to the rotational speed information signal, as a function of an ascertained rotational speed of the signal generator ring,
    wherein the control unit is configured to generate the additional rotational speed information signal only until the ascertained rotational speed exceeds a predefined limit rotational speed.

9. The apparatus as claimed in claim 8, wherein the rotational speed sensor is a rotational speed sensor of a motor vehicle.

10. A rotational speed sensor device for a motor vehicle, the rotational speed sensor device comprising:
    a rotational speed sensor including (i) a signal generator ring having a plurality of magnetic elements equally distributed over a circumference thereof with alternating magnetic orientation, and (ii) a signal receiver having at least two sensor elements configured to detect magnetic field strengths of the plurality of magnetic elements, the at least two sensor elements being spaced at an equal distance from one another; and
    an apparatus having a control unit configured to (i) generate a rotational speed information signal having information bits as a function of the magnetic field strengths detected by the at least two sensor elements, and (ii) generate at least one additional rotational speed information signal and add the at least one additional rotational speed information signal to the rotational speed information signal to increase a signal resolution of the rotational speed information signal, as a function of an ascertained rotational speed of the signal generator ring,
    wherein control unit is configured to generate the rotational speed information signal using an AK protocol, and
    wherein the increased signal resolution is included as an information bit of the AK protocol.

11. The rotational speed sensor device as claimed in claim 10, wherein the at least two sensor elements of the signal receiver comprise three sensor elements configured as a bridge circuit.

12. A method for operating a rotational speed sensor, the rotational speed sensor including (i) a signal generator ring having a plurality of magnetic elements equally distributed over a circumference thereof with alternating magnetic orientation, and (ii) a signal receiver having at least two sensor elements configured to detect magnetic field strengths of the plurality of magnetic elements, the at least two sensor elements being spaced at an equal distance from one another, the method comprising:

generating a rotational speed information signal having information bits as a function of the magnetic field strengths detected by the at least two sensor elements; and generating at least one additional rotational speed information signal and adding the at least one additional rotational speed information signal to the rotational speed information signal, as a function of an ascertained rotational speed of the signal generator ring, the at least one additional rotational speed information signal having a current strength that differs from a current strength of the rotational speed information signal.

13. The method as claimed in claim 12, wherein the rotational speed sensor is a rotational speed sensor of a motor vehicle.

14. The method as claimed in claim 12, the generating of the at least one additional rotational speed information signal comprising:

generating the at least one additional rotational speed information signal as a function of the detected magnetic field strengths.

15. The method as claimed in claim 12, wherein the at least two sensor elements of the signal receiver comprise three sensor elements configured as a bridge circuit.

* * * * *